United States Patent [19]
Koziol

[11] 3,753,431
[45] Aug. 21, 1973

[54] GAS SUPPLY UNIT FOR PORTABLE GRILL

[75] Inventor: Walter Koziol, Russell, Ill.

[73] Assignee: Beatrice Foods Co., Chicago, Ill.

[22] Filed: May 8, 1972

[21] Appl. No.: 251,108

[52] U.S. Cl. ............................................. 126/38
[51] Int. Cl. ............................................ F24c 5/20
[58] Field of Search ............................... 126/38, 9

[56] References Cited
UNITED STATES PATENTS
2,955,588  10/1960  Axelsson .............................. 126/38
3,608,538  9/1971  Guerreru .......................... 126/38 X

*Primary Examiner*—Edward G. Favors
*Attorney*—Neil E. Hamilton

[57] ABSTRACT

A gas supply unit for a portable gas grill which is easily assembled and disassembled to a standard portable gas supply tank. A base member for the grill has a compartment into which the gas inlet tube for the burner element and the gas outlet tube from the gas supply control unit are interfitted in an easily removable manner. In preferred embodiment, the gas outlet tube has a butterfly type bolt for threadable engagement with the compartment to hold it in place inside the inlet tube and the compartment. A support arm which is pivotally attached to a support rack for the base holds the gas supply tank at a determined level. The gas outlet tube with the gas control, the supporting rack and the gas tank all are adapted to be carried within the confines of the base and cover for the grill.

10 Claims, 5 Drawing Figures

PATENTED AUG 21 1973
3,753,431
SHEET 1 OF 2

3,753,431

GAS SUPPLY UNIT FOR PORTABLE GRILL

BACKGROUND OF THE INVENTION

This invention relates to gas barbecue grill units and more particularly to gas grill units of the portable type wherein the gas supply mechanism can be easily assembled and disassembled to the burner element.

With the advent of portable gas grills, problems arise concerning the portability of the gas supply means and its connections and disconnections to the burner element in the gas grill unit. The ideal gas supply unit should adapt itself to a standard gas supply tank and be easily and safely secured to the burner element in the base of the grill unit. It should be of suitable size so as to be carried within the confines of the base and cover of the grill housing. The gas supply means should have an attachment and detachment mechanism which is easily handled yet will provide a positive interconnection with the burner element. Means should also be afforded to support the gas supply tank in a secure manner so that it is not accidentally struck and cause a straining of the connection with the burner element. The entire gas supply unit should be manufactured with the minimum number of parts and with no loose part members.

It is an object of the present invention to provide a gas supply unit for a portable gas grill which is easily assembled and disassembled from the portable unit. It is another object of this invention to provide a gas supply unit for a portable gas grill which employs a minimum number of parts and has no loose part members. It is still another object of the present invention to provide a portable supply of gas which can be safely connected to the burner element of the grill and with the gas supply tank supported in a secure manner. It is yet another object of this invention to provide a gas supply mechanism for a portable gas grill wherein all of the parts are easily transported in the unit itself.

SUMMARY OF THE INVENTION

The foregoing objects are accomplished by the present gas supply unit wherein a compartment is fabricated in the base and has passages to receive an inlet tube from the burner and an outlet tube from the gas supply control means. The compartment has an opening through the floor of the base to provide for air to be aspirated into the burner inlet tube as the two tubes are interconnected in the compartment in a loose manner with the gas outlet tube disposed inside the gas inlet tube. The gas outlet tube carries a butterfly type bolt to engage complementary threads in the wall of the base and the compartment to position the outlet tube in the inlet tube. Support means are provided for the gas supply tank which is pivotally attached to a rack for supporting the grill. All of the foregoing mentioned parts are, either together or by themselves, adapted to be folded so as to be accommodated and carried within the confines of the grill unit.

BRIEF DESCRIPTION OF DRAWINGS

A better understanding of the present gas supply unit will be accomplished by reference to the drawing wherein.

DESCRIPTION OF THE PREFERRED EMBODIMENT

Figure 1:
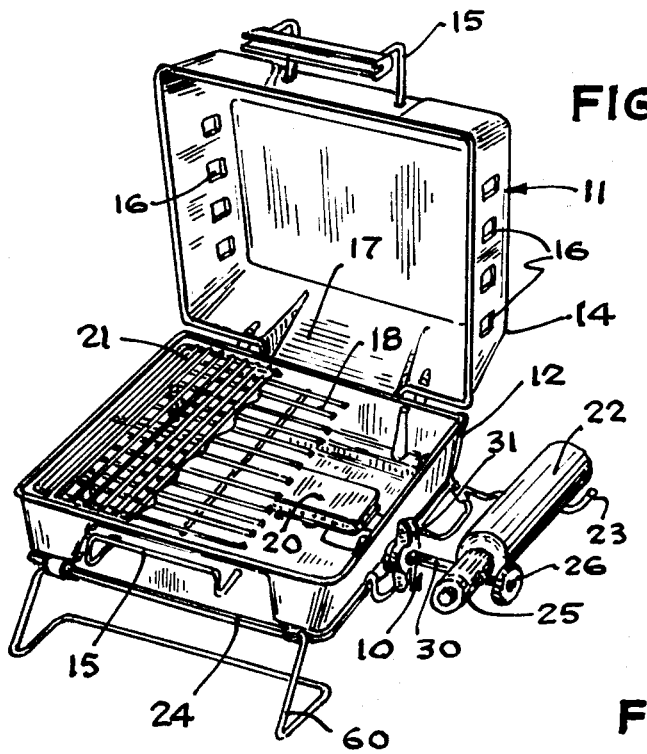
FIG. 1 is a perspective view of a portable gas barbecue grill partially broken away to show the burner unit with a gas tank and an associated control attached.
Figure 2:
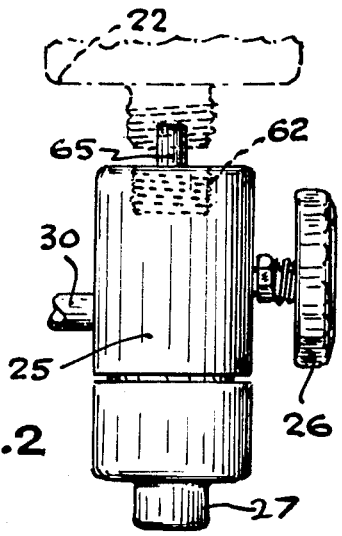
FIG. 2 is a view in side elevation illustrating the gas control device in a position to be secured to a portable gas tank.

Proceeding to a detailed description of the present invention, the gas supply unit generally 10 is shown in conjunction with a portable gas-fired grill generally 11 which has a base 12 and a hinged cover 14. Handles 15 are provided on cover 14 as well as on base 12 for transporting the grill, and openings 16 in addition to a rear vent 17 are provided in the cover. The base 12 has the usual grid 18 for supporting preferably porous ceramic briquettes (not shown) which aid in distributing heat from burner element 20. An upper grill 21 is also supported by base 12 for the usual cooking of food.

Figure 3:
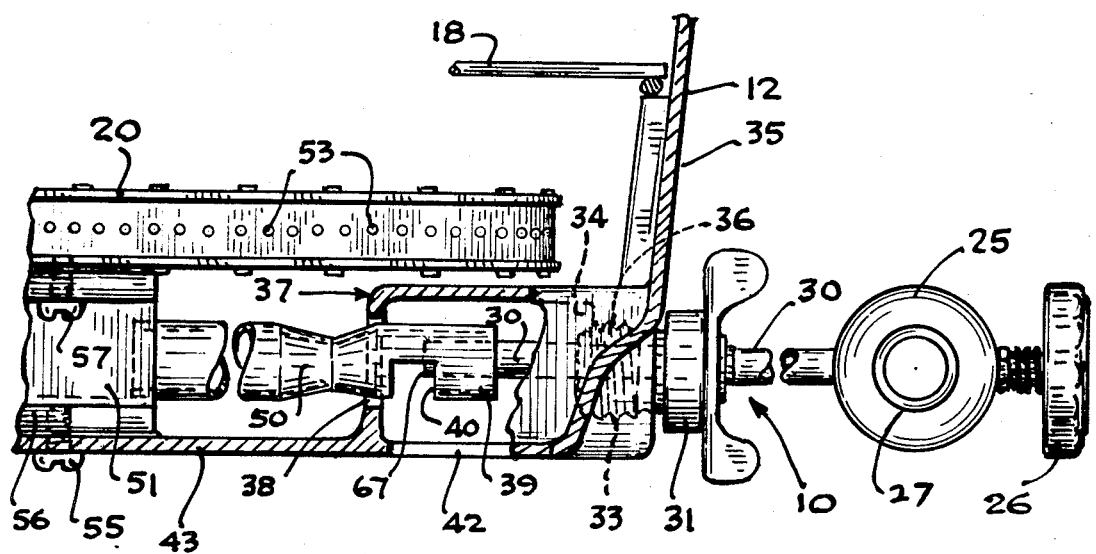
FIG. 3 is a partial view in vertical section and with portions broken away illustrating the attachment of the gas control device to the burner shown in FIG. 1.
Figure 5:
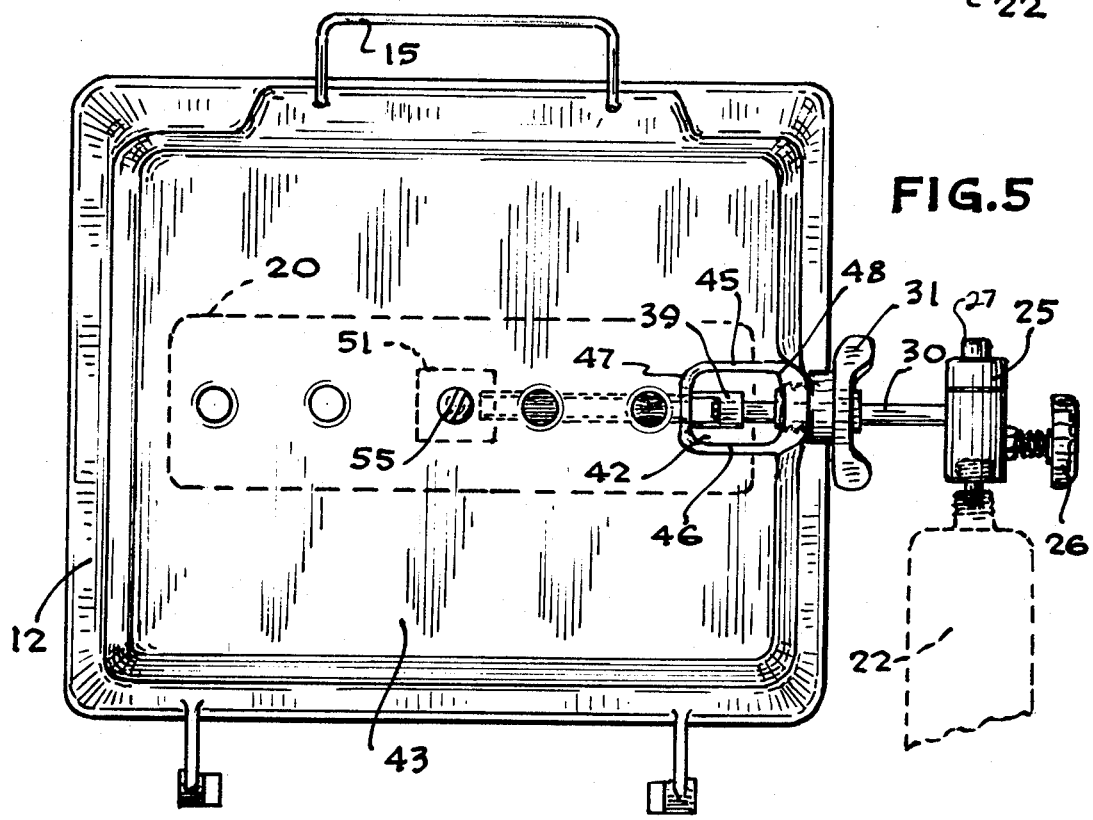
FIG. 5 is a bottom plan view of the base of the grill unit shown in FIGS. 1, 3 and 4 with the burner assembly shown in broken lines.

A small gas tank 22 of the standard variety containing the usual compressed fuel gas such as propane is held in a supported condition by a laterally extending hook 23 which is pivotally attached to a supporting frame or rack 24 for base 12 of grill 11. Secured to tank 22 in a gas-tight manner is a combined regulator and control device 25 which is manufactured by Turner Company, a division of Olin Corporation, Sycamore, Illinois and described in U. S. Pat. No. 3,521,669. It is a regulator type control valve operable by spring loaded knob 26 with a spring biased regulator section 27. A gas outlet tube 30 extends from the control device and has rotatably mounted thereon a butterfly type winged bolt 31. This bolt 31 is positioned on outlet tube 30 by common spacers which frictionally engage tube 30 but permit rotation of bolt 31 without travel. As best shown in FIG. 3, internal threads 33 are disposed near the bottom of base 12 and surround an opening or passage 34 which permits passage of outlet tube 30 through the side wall 35 of base 12 with the external threads 36 of bolt 31 engaging the internal threads 33. A U-shaped compartment 37 is formed internally in base 12 and surrounds channel 34. This compartment has an other opening or channel 38 to permit gas inlet tube 39 to extend into compartment 37 and receive gas outlet tube 30 internally therein. Gas inlet tube 39 has an opening 40 for receiving air through an opening 42 in the floor of base 12. This is best seen in FIG. 5 with opening 42 being substantially oval-shaped and coextensive with the lateral walls 45 and 46 as well as end walls 47 and 48 of compartment 37, the latter in effect forming a channel through base 12 for the interfitting of outlet tube 30 and inlet tube 39.

Gas inlet tube 39 has a Venturi section 50 and ultimately is connected in a gas-tight manner with central chamber 51 which in turn is in fluid communication with burner element 20 having apertures 53 for distributing gas for combustion. Burner element 20 is secured in base 12 and to floor 43 by means of screw 55 which threadably engages the bottom wall 56 of chamber 51 and a second screw 57 secures chamber 51 to burner element 20.

Figure 4:
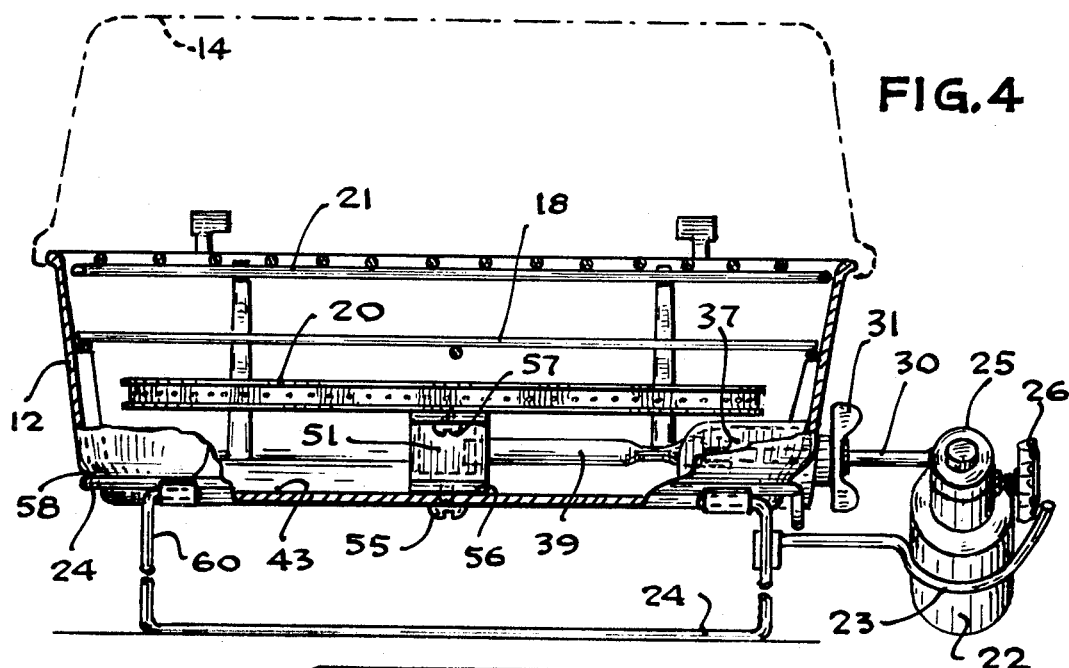
FIG. 4 is a view in side elevation of the unit shown in FIG. 1 with portions of the base broken away to show the burner assembly, and the support for the gas tank.

As best shown in FIG. 4, a peripherally extending indented side wall 58 is molded in base 12 and exteriorly to provide a support shoulder for rack or supporting frame 24. Pivotally attached foot members such as 60 are located to the front and rear of the base 12 and are designed to be folded toward each other so that the entire rack will fit within the confines of cover 14 when closed on base 12.

OPERATION

A better understanding of the advantages of gas supply unit 10 will be had by a description of its operation. Control device 25 along with gas tank 22 and supporting frame 24 will be accommodated and carried inside cover 14 on grill 21. When it is desired to use gas-fired grill 11 for cooking, support frame or rack 24 is removed, foot members pivoted to an open position and hook 23 extended outwardly so that the rack and the hook assume a position shown in FIGS. 1 and 4 with the rack 24 engaging indented side wall 58 in base 12. Tank 22 will next be screwed into the threaded sleeve 62 of control device 25 so that inlet nipple 65 will communicate with the inside of tank 22, tank 22 having the usual biased valve in the neck to sealably receive nipple 65 and close upon its withdrawal. At this stage, control 25 will be in a closed position with knob 26 turned inwardly. Next, tank 22 will be placed in hook 23 and gas outlet tube 30 inserted through passage 34 in base 12 and into gas inlet tube 39. External threads 36 on winged bolt 31 will be turned into internal threads 33 encompassing passage 34. Winged bolt 31 will be turned until a firm seating is afforded and by a determined placement of bolt 31 on gas outlet tube 30 the end 67 of outlet tube 30 will be positioned in opening 40 of inlet tube 39 when a finger-tight engagement is accomplished. This is best seen in FIG. 3. With gas control device 25 interconnecting gas inlet tube 39 with tank 22, knob 26 will be turned a small distance to open a valve inside control device 25 and gas will flow through outlet tube 30 and into inlet tube 39. Air will be drawn into opening 40 to mix with the gas by means of Venturi 50. The resulting mixture will flow through chamber 51 and into element 20 where the gas will be ignited at apertures 53.

To disassemble the gas supply unit, the foregoing steps are merely reversed. However, it would not be necessary to remove control device 25 from tank 22 as they both can be carried inside cover 14 in an assembled condition. Thus, it will be noted that all that is actually required to connect or disconnect the gas supply to gas-fired grill 11 is the turning of one bolt, namely, 31.

Gas-fired grill 11 is made from cast aluminum whereas rack or supporting frame 24 as well as grid 18 and grill 21 are manufactured from plated steel. Outlet tube 30, inlet tube 39 and burner element 20 can be fabricated from stainless steel. Brass is used to fabricate winged bolt 31. Of course, other metals and alloys could be used if desired. It should be pointed out that fabrication of the entire grill with the gas supply unit is very simple. For example, all that is required to install or remove burner element 20 from base 12 is to fasten or loosen screw 55.

Whereas a hook 23 is afforded to support tank 22, this is not necessary and could be eliminated. Neither is it essential that opening 42 in the floor 43 of base 12 extend the entire distance between compartment walls 45–48. It could be made smaller and/or slotted and if desired, a screen could be placed over it.

It will thus be seen that through the present invention there is now provided a gas supply unit for a portable gas grill which is easily attached or disassembled from the grill unit. It is easily carried within the grill unit itself and is in part constructed from readily available components. All of the components are durable and even in the disassembled condition, no small parts such as small bolts, screws, nuts, etc. need be manipulated or retained separately for future use. The source of gas is safely supported in the connected position and done so by a foldable support and rack member which also is carried inside the grill unit.

The foregoing invention can now be practiced by those skilled in the art. Such skilled persons will know that the invention is not necessarily restricted to the particular embodiment presented herein. The scope of the invention is to be defined by terms of the following claims as given meaning by the preceding description.

I claim:

1. An easily assembled and disassembled gas supply unit for a portable gas grill comprising: a base member adapted to support a cooking grill and a cover for the base, a channel member disposed in said base and extending from an exterior wall of said base member, a passage in said channel, a burner element adapted to be received within the confines of said base member, a gas inlet tube for said burner element extending from said burner element and constructed to be received a determined distance in said passage, an other passage in said channel spaced from said passage containing said gas inlet tube, a gas control device, a gas outlet tube extending from said gas control device and constructed to be received in said other passage in said channel and in a position to direct gas into said gas inlet tube, an additional passage in said channel in communication with the surrounding atmosphere constructed and arranged to permit air to be aspirated into said gas inlet tube and means carried by said gas outlet tube and said base member in proximity to said other passage to removably secure said outlet tube in said base member.

2. The gas supply unit as defined in claim 1 wherein said means to removably secure said gas outlet tube in said base member comprises threaded members carried by both said gas outlet tube and said base member.

3. The gas supply unit as defined in claim 2 wherein said threaded member carried by said base is internally threaded and said threaded member carried by said gas outlet tube is externally threaded.

4. The gas supply unit as defined in claim 3 wherein said threaded member carried by said gas outlet tube further includes wing members extending from said threaded member.

5. The gas supply unit as defined in claim 1 wherein said gas inlet tube has an opening disposed a short distance inwardly from its termination in said channel and adjacent said additional passage, said gas outlet tube terminating in said inlet tube and within the confines of said opening.

6. The gas supply unit as defined in claim 5 wherein said channel with said passages are formed from a compartment fabricated internally of said base member.

7. The gas supply unit as defined in claim 6 wherein said compartment is substantially of a U-shaped configuration with said additional passage being an opening in the floor of the base member and being coextensive with the lateral wall members of said compartment.

8. The gas supply unit as defined in claim 2 further including a portable supply gas container secured to said gas control device and a support means extending from said base member to engage said gas container and hold it at a determined level above a surface.

9. The gas supply unit as defined in claim 8 wherein said support means is pivotally mounted on a supporting rack for said base member; said supporting rack, said supporting means with said gas control device and said gas container are adapted to be disassembled and carried within the confines of said base and cover member.

10. The gas supply unit as defined in claim 1 wherein said burner element is removable secured in said base member by screw thread means extending through the floor of said base member.

* * * * *